US008874541B1

(12) United States Patent
Vandehey et al.

(10) Patent No.: US 8,874,541 B1
(45) Date of Patent: Oct. 28, 2014

(54) SOCIAL SEARCH ENGINE OPTIMIZER ENHANCER FOR ONLINE INFORMATION RESOURCES

(75) Inventors: Jeremy G. Vandehey, San Francisco, CA (US); Saravanan Coimbatore, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/362,990

(22) Filed: Jan. 31, 2012

(51) Int. Cl.
 *G06F 17/30* (2006.01)
(52) U.S. Cl.
 USPC ............ 707/706; 707/713; 707/723; 707/726
(58) Field of Classification Search
 USPC .................................. 707/706, 713, 723, 726
 See application file for complete search history.

(56) References Cited

U.S. PATENT DOCUMENTS

| | | | |
|---|---|---|---|
| 2002/0138513 | A1 | 9/2002 | Korotney et al. |
| 2006/0253316 | A1 | 11/2006 | Blackshaw et al. |
| 2007/0055694 | A1 | 3/2007 | Ruge et al. |
| 2008/0010131 | A1 | 1/2008 | Bridges et al. |
| 2008/0046327 | A1 | 2/2008 | Schnietz |
| 2008/0133500 | A1 | 6/2008 | Edwards et al. |
| 2008/0294625 | A1 | 11/2008 | Takeuchi |
| 2010/0042608 | A1 | 2/2010 | Kane, Jr. |
| 2010/0318442 | A1 | 12/2010 | Paul et al. |
| 2011/0022537 | A1 | 1/2011 | Nickerson et al. |
| 2011/0246277 | A1* | 10/2011 | Neldurg et al. ............ 705/14.25 |
| 2011/0282888 | A1 | 11/2011 | Koperski et al. |
| 2011/0302145 | A1* | 12/2011 | Brown et al. ................. 707/706 |
| 2012/0047211 | A1 | 2/2012 | Hughes |
| 2012/0089429 | A1 | 4/2012 | Geddes et al. |
| 2012/0123891 | A1* | 5/2012 | Patel ............................ 705/26.2 |
| 2012/0290553 | A1* | 11/2012 | England et al. .............. 707/706 |
| 2013/0007238 | A1 | 1/2013 | Sandholm |
| 2013/0054693 | A1* | 2/2013 | Chennamadhavuni ....... 709/204 |
| 2013/0117131 | A1 | 5/2013 | Robinson et al. |

FOREIGN PATENT DOCUMENTS

| | | |
|---|---|---|
| WO | 2009050529 A2 | 4/2009 |
| WO | 2012097458 A1 | 7/2012 |

OTHER PUBLICATIONS

Catone "9 Web Apps for Gather customer Feedback", Mar. 6, 2011m http://mashable.com/2011/03/06/user-feedback-apps/.*
"Keyword research—a beginner's guide/Marketing Donut", Nov. 28, 2011.*
Office Action dated Jul. 1, 2013 in U.S. Appl. No. 13/358,341, filed Jan. 25, 2012; (43 pages).

(Continued)

*Primary Examiner* — Etienne Leroux
*Assistant Examiner* — Cindy Nguyen
(74) *Attorney, Agent, or Firm* — Vista IP Law Group LLP

(57) ABSTRACT

Methods, systems, and computer program products for identifying search keywords for searching for an online information resource are disclosed. The method involves receiving a request, from a business, for search keywords relating to the content of the business's online information resource. The method further involves generating a post including a link to a search keyword recommendation page; and publishing, using a social network application, the post to a newsfeed in a social network. Additionally, the method involves receiving, from social network users, a plurality of search keywords relating to the online information resource's content. In addition, the method involves ranking the received search keywords; and presenting, to the business, the most popular search keywords. Further, the method involves receiving, from the business, a selection of search keywords from the most popular keywords; and publishing the business's online information resource to include the search keywords that were selected by the business.

27 Claims, 8 Drawing Sheets

(56) References Cited

OTHER PUBLICATIONS (Canton, Josh, Social Media 9 Web Apps for Gathering Customer Feedback, Mar. 6, 2011, Mashable.com, http://mashable.com/2011/03/06/user-feedback-apps/, p. 2-12)

(Herngaard, Anne, How to Improve Your News Feed Ranking on Facebook, Sep. 6, 2011, MindJumpers Social Media Management, http://www.mindjumpers.com/blog/2011/09/newsfeed-on-facebook/, p. 1-2)

(Jason, Search Engineer, Yelp Top 10 restaurants of 2010!, Jan. 4, 2011, Yelp Web Log "reaching for the fifth star", http://officialblog.yelp.com/2011/01/yelp-top-10-restaurants-of-2010.html, p. 1-2).

(Deatch, Katie, Facebook meets customer reviews—A new service lets e-retailers use shoppers' Facebook profiles to help sell products, Sep. 17, 2010, Social Media Internet Retailer, http://www.internetretailer.com/2010/09/17/facebook-meets-customer-reviews, p. 1-2).

(Harmon, Stacy, Facebook's Wall vs. News Feed Explained, Sep. 30, 2011, Harmon Enterprises, http://www.harmonenterprises.com/coaching/facebooks-wall-vs-news-feed-explained/, p. 1)

(Mokbel, Mohamed, F., Personalized, Socialization, and Recommendations in Location-based Services 2.0, Department of Computer Science and Engineering, University of Minnesota, Minneapolis, 2011, p. 1-6).

(Suto, Wendy, Top 13 Must-have Facebook Applications for Business, Oct. 14, 2010, Site Pro flews, http://www.sitepronews.com/2010/10/14/top-13-must-have-facebook-applications-for-business/, p. 1-2).

(Weinberg, Tamar, How to Use Facebook for Business and Marketing, 2010, Techipedia, http://www.techipedia.com/2010/how-to-use-facebook-for-business-and-marketing/, p. 1-12).

\* cited by examiner

Search Keyword Recommendation Page 400

Jeremy, you can really help Mr. Smith out. By completing the following form, you'll give Mr. Smith valuable search keyword ideas for his website. You can be proud of the fact that you have helped Mr. Smith to receive more visitors to his website! Complete the following search keyword fields, and Mr. Smith will be sent your search keyword recommendations!

Please provide 10 search keywords you would use when searching for Mr. Smith's business website. Please type in these search keywords in the order from most likely to use to less likely to use (i.e. search keyword 1 would be the most likely to use search keyword, and search keyword 10 would be the least likely to use search keyword of the set of 10 search keywords you have provided). Then, press "submit".

Search Keyword 1: [ ]

Search Keyword 2: [ ]

Search Keyword 3: [ ]

Search Keyword 4: [ ]

Search Keyword 5: [ ]

Search Keyword 6: [ ]

Search Keyword 7: [ ]

Search Keyword 8: [ ]

Search Keyword 9: [ ]

Search Keyword 10: [ ]

[ 402 Submit ]

FIG. 4

Feedback Page 500

Mr. Smith, you are well on your way to publishing your website with search keywords recommended by your friends, family, fans, and customers. Please select which search keywords from the search keyword listing below you would like included on your business website. (Please note that the search keywords below have been ranked from most popular search keyword to the least popular search keyword of the top 10 recommended search keywords, with search keyword 1 being the most popular and search keyword 10 being the least popular.)

Check the Box to Select the Search Keyword

- ☐ Search Keyword 1: Design
- ☐ Search Keyword 2: Affordable
- ☐ Search Keyword 3: High End
- ☐ Search Keyword 4: Discount
- ☐ Search Keyword 5: Modern
- ☐ Search Keyword 6: Sleek
- ☐ Search Keyword 7: Interior Design
- ☐ Search Keyword 8: Mid Century
- ☐ Search Keyword 9: Retro
- ☐ Search Keyword 10: Furniture Please indicate if you would like your selected search keywords to be included in the visible content of your website and/or the HTML metadata of your website.

Check the Box to Select

- ☐ Search Keyword(s) included in Visible Content
- ☐ Search Keyword(s) included in HTML metadata 502 Submit

FIG. 5

Feedback Page 500

Mr. Smith, you are well on your way to publishing your website with search keywords recommended by your friends, family, fans, and customers. Please select which search keywords from the search keyword listing below you would like included on your business website. (Please note that the search keywords below have been ranked from most popular search keyword to the least popular search keyword of the top 10 recommended search keywords, with search keyword 1 being the most popular and search keyword 10 being the least popular.)

Check the Box to Select the Search Keyword

| [X] | Search Keyword 1: | Design |
| [X] | Search Keyword 2: | Affordable |
| [X] | Search Keyword 3: | High End |
| [ ] | Search Keyword 4: | Discount |
| [X] | Search Keyword 5: | Modern |
| [ ] | Search Keyword 6: | Sleek |
| [X] | Search Keyword 7: | Interior Design |
| [X] | Search Keyword 8: | Mid Century |
| [ ] | Search Keyword 9: | Retro |
| [X] | Search Keyword 10: | Furniture |

Please indicate if you would like your selected search keywords to be included in the visible content of your website and/or the HTML metadata of your website.

Check the Box to Select

[X] Search Keyword(s) included in Visible Content

[X] Search Keyword(s) included in HTML metadata

502 Submit

FIG. 6

SOCIAL SEARCH ENGINE OPTIMIZER ENHANCER FOR ONLINE INFORMATION RESOURCES

BACKGROUND

Embodiments of the invention relate to search engine optimizer (SEO) enhancers. In particular, the embodiments relate to social search engine optimizer enhancers for online information resources such as websites, on-line advertising and blogs.

Businesses often use websites to market products and/or services to consumers. Unfortunately, sometimes consumers have difficulty finding online information resources such as websites of the business through basic internet searches using internet search engines. For websites to be located by consumers performing basic internet searches, it is helpful if the websites contain the specific search terms and/or phrases that the consumers are using for their internet searches.

Businesses struggle to identify unique or different search keywords and/or search phrases that their customers use to search for their business. Existing solutions use software that simply provides synonyms and common related search keywords and phrases. The present disclosure allows businesses to leverage their social networks by asking their friends, family, fans, and customers to recommend search keywords and phrases that they would use when searching for the business's website. The human factor of social networks enhances the quality of the structured data and allows the businesses to have a more complete and diverse set of search keyword and phrase assets.

SUMMARY

Certain embodiments relate to computer-implemented methods for identifying search keywords for searching for an online information resource such as a website. A method according to one embodiment involves receiving, from a business, a request for search keywords relating to the content of the website of the business. The method further involves generating, in response to receiving the request, a post comprising information about the business and a link to a search keyword recommendation page. Also, the method involves publishing, using a social network application, the post to a newsfeed in a social network, where a plurality of users in the social network subscribe to the newsfeed. In addition, the method involves receiving, in response to publishing the post and from the plurality of users, a plurality of search keywords relating to the content of the website from the page with search keyword recommendations.

Additionally, the method involves ranking, in response to receiving a plurality of search keywords, the search keywords in order from most popular to least popular. Also, the method involves presenting, to the business, search keywords based at least in part upon the ranking. In addition, the method involves receiving, from the business, a selection of at least one search keyword from the search keywords presented to the business. Further, the method involves publishing the website comprising the selected search keyword(s).

In a single or multiple embodiments, the post further comprises a name of the business, a name of the owner of the business, the location of the business, at least one product sold by the business, and/or an image of the home page of the website of the business. In one or more embodiments, the search keyword recommendation page comprises a request for a specified number of search keywords relating to the content of the website of the business. In at least one embodiment, the most popular search keywords are presented to the business in an order from most popular to least popular. In some embodiments, a predetermined number of the highest ranked search keywords are presented to the business.

In a single or multiple embodiments, the method further involves presenting, to the business, an option to publish the selected search keyword(s) on the website by including the selected search keyword(s) as part of the content of the website that can be viewed by visitors, and/or by incorporating the selected search keyword(s) as part of the HTML metadata of the website. In one or more embodiments, the method further involves receiving, from the business, a selection of the option to publish the selected search keyword(s) on the website. In at least one embodiment, the selected search keyword(s) is published to the website according to the selection, by the business, of the option to publish the selected search keyword(s).

In a single or multiple embodiments, a system for identifying search keywords for searching for a website involves a processor, and a social website publishing application executing on the processor. In one or more embodiments, the social website publishing application is configured to receive, from a business, a request for search keywords relating to the content of the website of the business. The social website publishing application is further configured to generate, in response to receiving the request, a post comprising information about the business and a link to a search keyword recommendation page. The social website publishing application may also be configured to publish, using a social network application, the post to a newsfeed in a social network, where a plurality of users in the social network subscribes to the newsfeed. In addition, the social website publishing application is configured to receive, in response to publishing the post and from the plurality of users, a plurality of search keywords relating to the content of the website from the search keyword recommendation page.

In addition, the social website publishing application is configured to rank, in response to receiving a plurality of search keywords, the search keywords in order from most popular to least popular. Additionally, the social website publishing application is configured to present, to the business, search keywords based at least in part upon the ranking. The social website publishing application may also be configured to receive, from the business, a selection of at least one search keyword from the search keywords that were presented to the business. Further, the social website publishing application is configured to publish the website comprising the selected search keyword(s).

In a single or multiple embodiments, the social website publishing application is further configured to present, to the business, an option to publish the selected search keyword(s) on the website by including the selected search keyword(s) as part of the content of the website that can be viewed by visitors, and/or by incorporating the selected search keyword(s) as part of the HTML metadata of the website. In one or more embodiments, the social website publishing application is further configured to receive, from the business, a selection of the option to publish the selected search keyword(s) on the website. In some embodiments, the selected search keyword(s) is published to the website according to the selection, by the business, of the option to publish the selected search keyword(s).

In a single or multiple embodiments, a non-transitory computer readable storage medium storing instructions for identifying search keywords for searching for a website is disclosed. The instructions are executable on a processor, and involve functionality for receiving, from a business, a request for search keywords relating to the content of the website of the business. The instructions further involve functionality for generating, in response to receiving the request, a post comprising information about the business and a link to a search keyword recommendation page. The instructions may also involve functionality for publishing, using a social network application, the post to a newsfeed in a social network, where a plurality of users in the social network subscribes to the newsfeed. In addition, the instructions involve functionality for receiving, in response to publishing the post and from the plurality of users, a plurality of search keywords relating to the content of the website from the search keyword recommendation page.

Additionally, the instructions involve functionality for ranking, in response to receiving a plurality of search keywords, the search keywords in order from most popular to least popular. The instructions may also involve functionality for presenting, to the business, search keywords based at least in part upon the ranking. In addition, the instructions involve functionality for receiving, from the business, a selection of at least one search keyword from the search keywords that were presented to the business. Further, the instructions involve functionality for publishing the website comprising the selected search keyword(s).

In a single or multiple embodiments, the instructions further involve functionality for presenting, to the business, an option to publish the selected search keyword(s) on the website by including the selected search keyword(s) as part of the content of the website that can be viewed by visitors, and/or by incorporating the selected search keyword(s) as part of HTML metadata of the website. In one or more embodiments, the instructions further involve functionality for receiving, from the business, a selection of the option to publish the selected search keyword(s) on the website. In at least one embodiment, the selected search keyword(s) is published to the website according to the selection, by the business, of the option to publish the selected search keyword(s).

The features, functions, and advantages can be achieved independently in various embodiments or may be combined in yet other embodiments.

BRIEF DESCRIPTION OF THE DRAWINGS

These and other features, aspects, and advantages of the present disclosure will become better understood with regard to the following description, appended claims, and accompanying drawings where:

FIG. 4 is a diagram of an exemplary search keyword recommendation page that may be employed by the disclosed system and method according to one embodiment for a social engine optimizer (SEO) enhancer;

FIG. 5 is a diagram of an exemplary feedback page that may be employed by the disclosed system and method according to one embodiment for a social engine optimizer (SEO) enhancer;

FIG. 6 is a diagram of the exemplary feedback page of FIG. 5 that is completed by one exemplary business owner.

DETAILED DESCRIPTION OF ILLUSTRATED EMBODIMENTS

Figure 1:
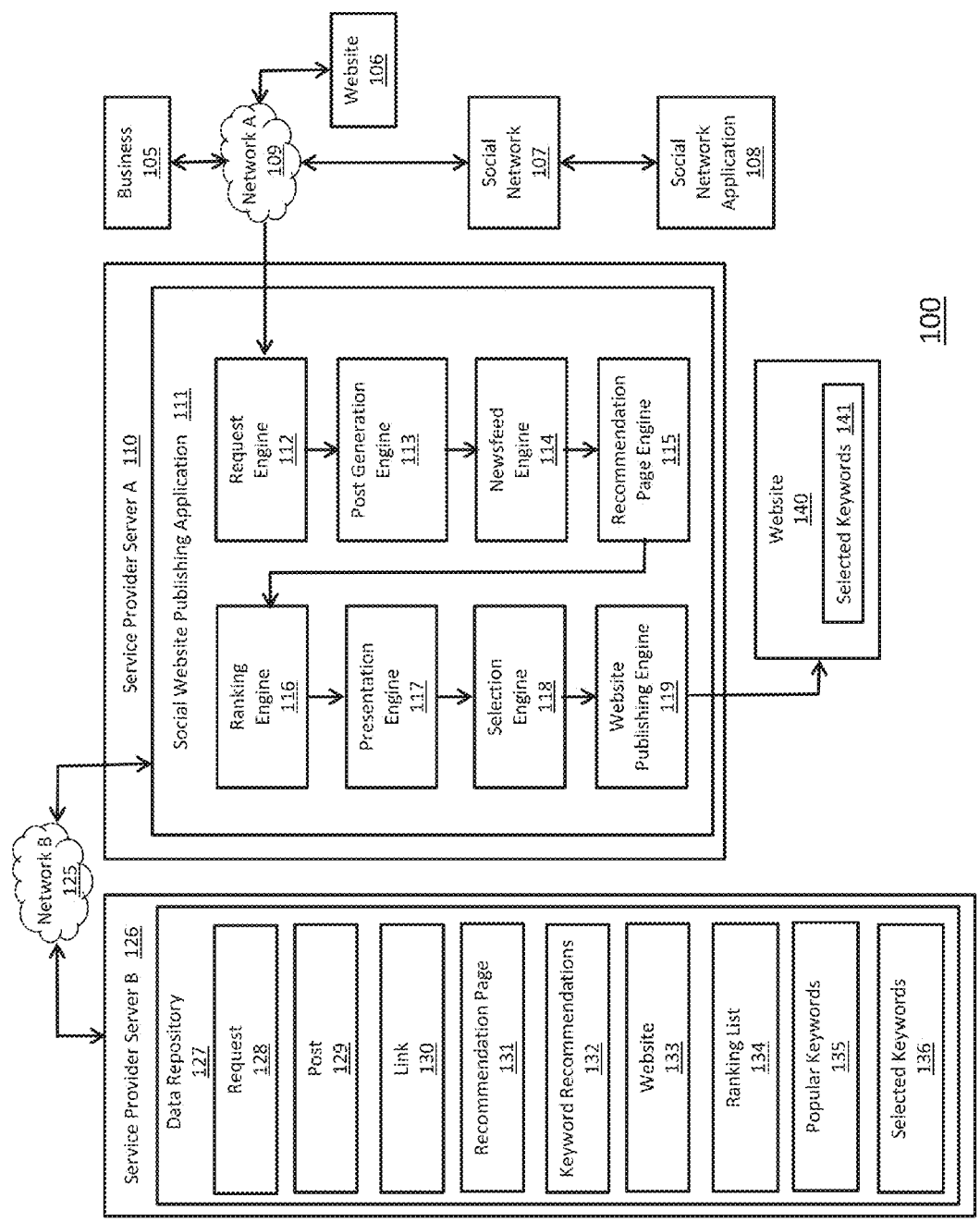
FIG. 1 is a diagram of the disclosed system according to one embodiment for a social engine optimizer (SEO) enhancer.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for a social engine optimizer (SEO) enhancer for websites. Specifically, the system or method may receive a request from a business for a recommendation pertaining to search keywords for the business's website, generate a post including a link to a search keyword recommendation page, publish the post to a newsfeed in a social network, receive search keyword recommendations from users in the social network via the search keyword recommendation page, rank the recommended search keywords from most popular search keywords to least popular search keywords, present at least a portion of the most popular search keyword recommendations to the business, receive a selection of search keywords from the business, and publish the website of the business including the selected search keywords. It should be noted that while certain embodiments are disclosed with respect to identification and incorporation of search keywords into an online information resource such as a website, embodiments may also be applied to select search keywords for incorporation into or associated with other online information resources of the business such as online marketing tools (e.g., Weblistings), a blog, and other online content and media.

Referring to FIG. 1, FIG. 1 shows a system (100) in accordance with one or more embodiments of the invention. As shown in FIG. 1, the system (100) includes components such as a social website publishing application (111) and a data repository (127). These components are described below and may be located on the same device (e.g. a server, mainframe, desktop Personal Computer (PC), laptop, Personal Digital Assistant (PDA), telephone, mobile phone, kiosk, cable box, and any other device), such as described in relation to FIG. 8 below, or may be located on separate devices connected by a network (e.g. the Internet, a wide area network (WAN), or a local area network (LAN)), with wired and/or wireless segments. In one or more embodiments of the invention, there may be more than one social website publishing application, and data repository running on a device, as well as more than one business, website, and social network interfacing with those components.

In one or more embodiments of the invention, a business (105) provides products and/or services to consumers. The business (105) may be the owner of a website (106) which the business (105) uses to market and sell products and/or services to consumers. The business (105) may also be a member of a social network (107). A social network (107) is an online social community made up of individuals, organizations, or businesses, which are connected by one or more specific types of interdependency, such as friendship, kinship, common interest, financial exchange, or relationships of beliefs, knowledge, or background. Types of social networks that may be employed by the disclosed system and method for the social network (107) include, but are not limited to, FACEBOOK, TWITTER, LINKEDIN, and GOOGLE+. Customers of the business (105) may also be members of the social network (107), and may "follow" the business (105). When a first member "follows" a second member, the first member is a subscriber of a newsfeed of the second member, and receives any posts that the second member may publish to its newsfeed. Therefore, a newsfeed allows for the real-time dissemination of information by a member to followers.

When the business (105) wants to receive valuable search keywords for its website (106), the business may enlist the aid of followers of the business (105) in the social network (107). Specifically, the business (105) may request search keyword recommendations of its followers and/or network in the social network (107), and the followers and/or network of the business (105) in the social network (107) may provide search keyword recommendations for the website (106) to improve the website (105) as a marketing and distribution tool, through a social network application (108). Subsequently, the business (105) may incorporate one or more of the search keyword recommendations provided by the members of the social network (107) to generate or modify the website (105) to include at least a portion of the recommended search keywords. Those skilled in the art will appreciate that there may be various other means by which a business (105) may enlist the aid of members of a social network (107) to obtain search keyword recommendations for a website (106).

In one or more embodiments of the invention, a service provider server A (110) is configured to host the social website publishing application (111), which is configured to publish a website. The social website publishing application (111) is a software application that includes several engines configured to perform specific functions to publish a website. Specifically, engines operating as part of the social website publishing application (111) may include functionality to receive a request from a business for a search keyword recommendation, generate a post including a link to a search keyword recommendation page, publish the post to a newsfeed in a social network, receive recommendations from the search keyword recommendation page, rank the recommended search keywords from most popular search keywords to least popular search keywords, present at least a portion of the most popular search keywords to a business, receive a selection of search keywords from the business, publish the website including the selected search keywords, and perform other calculations associated with publishing the website including the selected search keywords.

The social website publishing application (111) may receive input from various sources, including a business (105), and a social network (107). The social website publishing application (111) may store data in and/or access data from a data repository (127). The service provider server A (110), the social website publishing application (111), and other data stored on the service provider server A (110) may be owned and/or operated by a service provider (e.g. the owner, developer, and/or manager of the social website publishing application (111)). The social website publishing application (111) may include engines such as a request engine (112), a post generation engine (113), a newsfeed engine (114), a recommendation page engine (115), a ranking engine (116), a presentation engine (117), a selection engine (118), and a website publishing engine (119). Each engine of the social website publishing application (111) is described below. Those skilled in the art will appreciate that each of the engines described may have other functionality beyond that disclosed, and that the functionality of each engine may alternatively be performed by any of the other engines.

In one or more embodiments of the invention, a request engine (112) is configured to receive a request from a business (105) for a recommendation of search keywords. The request may be received from the business (105) through various means, such as a text or email from a mobile phone or computer. A recommendation includes search keywords for a website of a business and is generated by social network user. After receiving the request, the request engine (112) may process (i.e. modify, transform, format) the request, and then transmit the request to a post generation engine (113) for further processing. In parallel, the request engine (112) may pass control of the system (100) to any other engine. Those skilled in the art will appreciate that the request engine (112) may receive the request from other entities beyond the business (105), and may perform other functions beyond those disclosed.

In one or more embodiments of the invention, a post generation engine (113) is configured to generate a post including a link to a search keyword recommendation page. A post is an entry in a newsfeed of a business in a social network, and a search keyword recommendation page is a website and/or page within a social network that allows users in the social network to provide search keyword recommendations to the business. After generating a post, the post generation engine (113) may process (i.e. modify, transform, format) the post, and then transmit the post to a newsfeed engine (114) for further processing. In parallel, the post generation engine (113) may pass control of the system (100) to any other engine. Those skilled in the art will appreciate that the post generation engine (113) may perform other functions beyond those disclosed.

In one or more embodiments of the invention, a newsfeed engine (114) is configured to publish the post to a newsfeed in a social network. A newsfeed is a distribution mechanism in a social network that allows a user to disseminate information to followers. A newsfeed, for example, on FACEBOOK is a portion on a user's homepage that updates a list of stories from people and FACEBOOK pages that the user follows on FACEBOOK. On TWITTER, a newsfeed is a timeline listing on the user's homepage of stories from people and pages that the user follows on Twitter. The newsfeed engine (114) may receive the post from the post generation engine (113). After publishing the post, the newsfeed engine (114) may process (i.e. modify, transform, format) the post, and then transmit the post to a recommendation page engine (115) for further processing. In parallel, the newsfeed engine (114) may pass control of the system (100) to any other engine. Those skilled in the art will appreciate that the newsfeed engine (114) may receive the post from other entities beyond the post generation engine (113), and may perform other functions beyond those disclosed.

In one or more embodiments of the invention, a recommendation page engine (115) is configured to receive search keyword recommendations from the search keyword recommendation page. The search keyword recommendations may be text or another format. After receiving the search keyword recommendations, the recommendation page engine (115) may process (i.e. modify, transform, format) the search keyword recommendations, and then transmit the recommendations to a ranking engine (116) for further processing. In parallel, the recommendation page engine (115) may pass control of the system (100) to any other engine.

Those skilled in the art will appreciate that the recommendation page engine (115) may receive the search keyword recommendations from other entities beyond the recommendation page, and may perform other functions beyond those disclosed.

In one or more embodiments of the invention, a ranking engine (116) is configured to rank the search keyword recommendations to generate a ranked list of search keywords that are ordered from the most popular recommended search keywords to the least popular recommended search keywords. A ranked list is a list that includes search keyword recommendations that are arranged in an order determined by the number of search keyword recommendations that was received for each particular recommended search keyword, or another metric. After performing these actions, the ranking engine (116) may process (i.e. modify, transform, format) the ranked list, and then transmit control of the system (100) to a presentation engine (117) for further processing. In parallel, the ranking engine (116) may pass control of the system (100) to any other engine. Those skilled in the art will appreciate that the ranking engine (116) may perform other functions beyond those disclosed.

In one or more embodiments of the invention, a presentation engine (117) is configured to present at least a portion of the most popular search keyword recommendations to a business. The search keyword recommendations may be presented to the business by any suitable means, such as through a report that is distributed to the business in an email, or in the system (100). After presenting the search keyword recommendations, the presentation engine (117) may process (i.e. modify, transform, format) the presentation of the search keyword recommendations, and then transmit control of the system (100) to a selection engine (118) for further processing. In parallel, the presentation engine (117) may pass control of the system (100) to any other engine. Those skilled in the art will appreciate that the presentation engine (117) may perform other functions beyond those disclosed.

In one or more embodiments of the invention, a selection engine (118) is configured to receive a selection of the most popular recommended search keywords from the business (105). The selection is an identification of which search keyword or search keywords of the most popular recommended search keywords are to be incorporated into a website of the business. After receiving the selection, the selection engine (118) may process (i.e. modify, transform, format) the selection, and then transmit the selection to a website publishing engine (119) for further processing. In parallel, the selection engine (118) may pass control of the system (100) to any other engine. Those skilled in the art will appreciate that the selection engine (118) may receive the selection from other entities beyond the business (105), and may perform other functions beyond those disclosed.

In one or more embodiments of the invention, a website publishing engine (119) is configured to publish the website including the selected search keywords that were selected by the business (105). Publishing the website pushes the website out to a live network (i.e. the Internet). After publishing the website including the selected search keywords, the website publishing engine (119) may process (i.e. modify, transform, format) the website, and then pass control of the system (100) to any other engine. Those skilled in the art will appreciate that the website publishing engine (119) may perform other functions beyond those disclosed.

In one or more embodiments of the invention, the service provider server B (126) is configured to host a data repository (127). The data repository (127) may contain data associated with the social website publishing application (111). The data repository (127) may be a relational database that stores data entries associated with the social website publishing application (111). The data repository (127) may also be a spreadsheet containing data cells associated with the social website publishing application (111). In one or more embodiments of the invention, the data repository (127) may be implemented with many technologies. The data repository (127) may receive data from various sources, including the social website publishing application (111), and any of the engines of the social website publishing application (111), over a network B (125). After receiving data from the social website publishing application (111), the data repository (127) may process (i.e. modify, transform, format) the data, and then store the data. The data may include a request (128), a post (129), a link (130), a recommendation page (131), keyword recommendations (132), a website (133), a ranking list (134), popular keywords (135), and selected keywords (136). Those skilled in the art will appreciate that the data repository (127) may receive and store data from other entities beyond the social website publishing application (111), and may perform other functions beyond those disclosed. Further, the service provider server B (126), and the data stored on this server may be owned and/or operated by a service provider (e.g. the owner, developer, and/or manager of the social website publishing application (111)).

Figure 2:
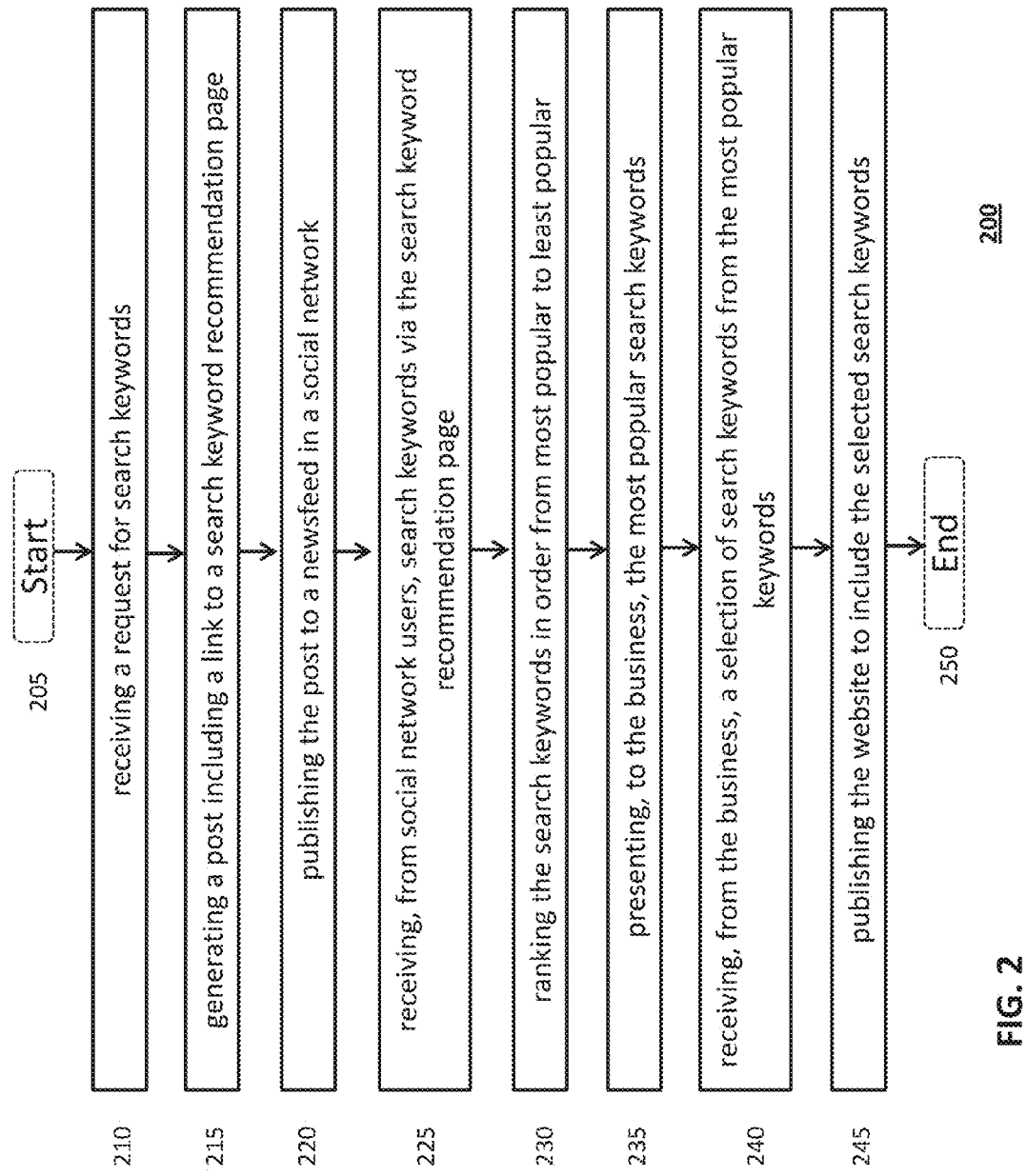
FIG. 2 is a flow chart of the disclosed method according to one embodiment for a social engine optimizer (SEO) enhancer.

Referring to FIG. 2, FIG. 2 shows a flowchart 200 in accordance with one or more embodiments of the invention. The process shown in FIG. 2 may use, for example, the system (100) shown in FIG. 1 described above and/or may be performed on the particular machine (i.e. computer system) shown in FIG. 8 described below. The sequence of steps shown in FIG. 2 may differ among embodiments of the invention, and one or more of the steps may be performed in parallel and/or may be optional. Accordingly, the scope of the invention should not be considered limited to the specific arrangement of steps shown in FIG. 2.

At the start 205 of the process, a request is received from a business. The request may be received, for example, from a business interacting with the social website publishing application over a computer, mobile device, or any other capable device. The request is for recommendations for search keywords relating to content of the business's website 210.

After the request for search keywords is received, a post is generated. The post may contain the business name, the business owner name, the location of the business, at least one product sold by the business, an image of the home page of the business's website, a picture of the business's logo, a picture of the business owner, a written description of the business written by the business owner or the system, and/or a link to a search keyword recommendation page 215.

Then, the post is published, using a social network application, to a newsfeed in a social network 220. A plurality of users in the social network subscribe to the newsfeed. The newsfeed may have, for example, various other posts that have been posted by the business and/or the system in the past. The newsfeed is a mechanism for the business to distribute messages to a user base (i.e. followers).

After the post is published, search keyword recommendations of social network users are received form a search keyword recommendation web page or similar mechanism within a social network 225. After the search keyword recommendations are received, the recommended search keywords are ranked in order from the most popular search keywords received to the least popular search keywords received 230.

After the recommended search keywords are ranked, a portion of the most popular recommended search keywords are presented to the business 235. The most popular recommended search keywords may be presented to the business through the system on any device used by the business (e.g. mobile phone, computer, tablet). The most popular search keyword recommendations are presented to the business in order from most popular search keyword to least popular search keyword, so that the business may select one or more of the recommended search keywords to incorporate into its website.

After the most popular recommended search keywords are presented to the business, a determination is made by the business to accept one or more of the recommended search keywords to be incorporated into the business's website. Then, the system receives a selection of one or more of the recommended search keywords from the business 240.

After the system receives a selection of one or more of the recommended search keywords from the business, the business's website may be published (and/or updated) by the system to the Internet. The website will include the search keywords that were selected by the business 245. After the website is published, the process ends 250.

In one or more embodiments of the invention, the search keyword recommendations may be obtained from users in the social network periodically, without intervention of the business. Subsequently, the website of the business may be modified or updated using the search keyword recommendations, also without the intervention of the business. In this manner, the website of the business may be periodically updated and made more efficient without the intervention of the business. The periodic updating of a website of a business may eliminate the time consuming effort of a business owner updating the content of their website regularly.

Those skilled in the art will appreciate that the crowdsourcing of content generation for a website of a business may make the website more effective. Further, aggregation of search keyword recommendations from different users, and allowing the business to approve, disapprove, and/or edit the proposed search keyword recommendations may make the website more effective by making it easier for customers to find by performing a basic internet search.

Figure 3:
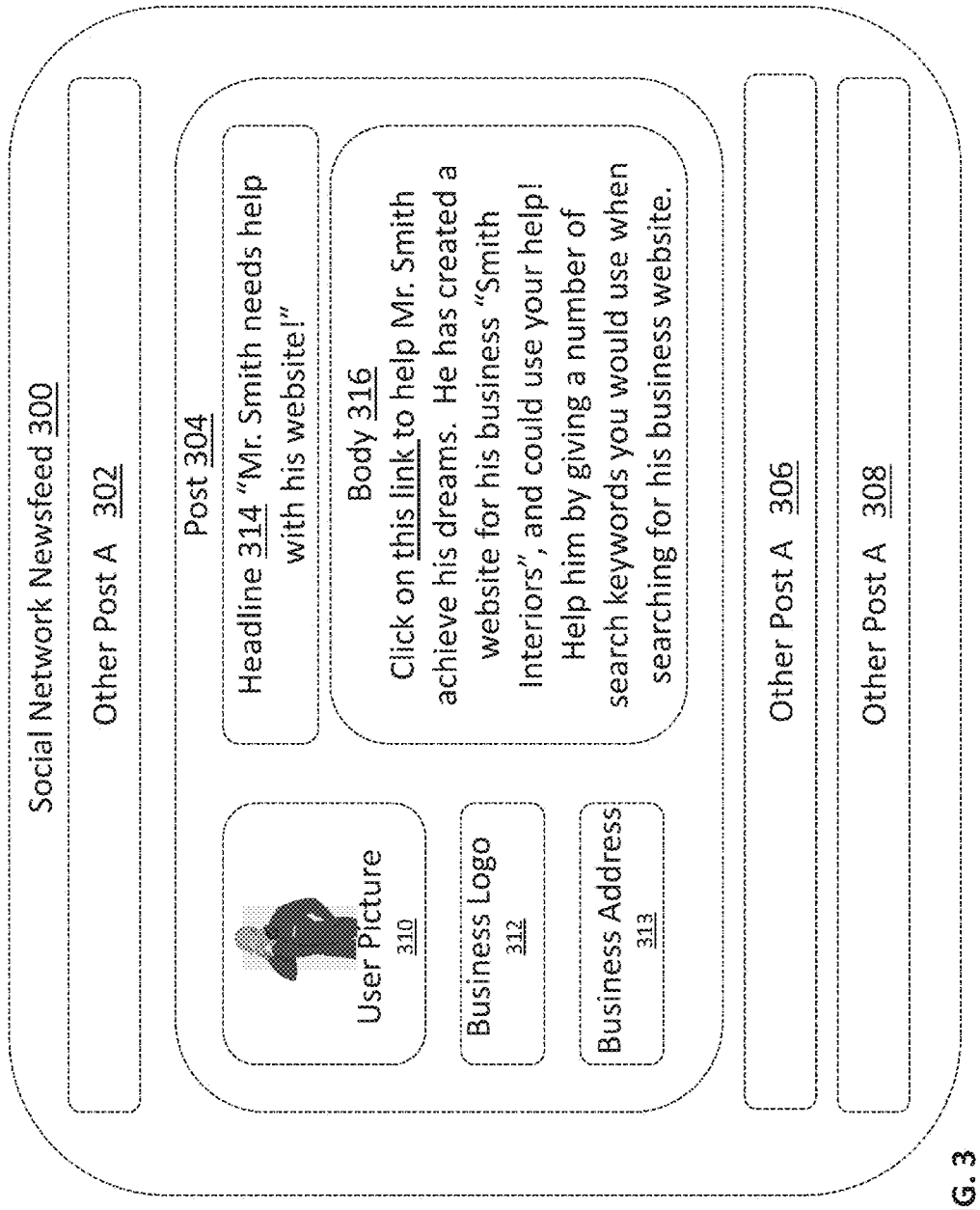
FIG. 3 is a diagram of an exemplary newsfeed that may be employed by the disclosed system and method according to one embodiment for a social engine optimizer (SEO) enhancer.

Referring to FIG. 3, FIG. 3 shows a social network newsfeed in accordance with one or more embodiments of the invention. The social network newsfeed shown in FIG. 3 may be used, for instance, with the system (100), to perform the disclosed method. The elements shown in FIG. 3 may differ among embodiments of the invention, and one or more of the elements may be optional.

In FIG. 3, a social network newsfeed (300) is displayed. The social network newsfeed (300) is a newsfeed that exists in a social network, and includes various posts such as other post A (302), post (304), other post B (306), and other post C (308). The posts are features of the social network newsfeed (300), posted to the social network newsfeed (300) by a business or the system, that contain various information. For example, post (304) contains a user picture (310) that displays an image related to the business (or other entity) associated with the post (304), a business (or entity) logo (312), an address of the business 313, a headline (314), and a body (316). The headline (314) contains text that described the contents of the post (e.g. "Mr. Smith needs help with his website!").

The body (316) contains text, images, and/or other descriptive matter that communicate a message about the business (or entity) and/or the website of the business (or entity). For example, the business (or entity) may want to enlist the aid of followers of the social network newsfeed (300) through the post (304), and can express this message through the body (316) of the post (304). For example, the body (316) of the post (304) may contain the following text—"click on this link to help Mr. Smith achieve his dreams. He has created a website for his business 'Smith Interiors', and could use your help! Help him by giving a number of search keywords you would use when searching for his business website." The link in the body (316) may refer to a search keyword recommendation page, where a user (i.e. follower of the social network newsfeed (300)) may submit search keyword recommendations, which may relate to the content of a website (e.g. existing or not). Those skilled in the art will appreciate that there may be various other elements in a post of a social network newsfeed.

Referring to FIG. 4, FIG. 4 shows a search keyword recommendation page (400) in accordance with one or more embodiments of the invention. The search keyword recommendation page (400) shown in FIG. 4 may be used, for instance, with the system (100), to perform the disclosed method. The elements shown in FIG. 4 may differ among embodiments of the invention, and one or more of the elements may be optional.

In FIG. 4, a search keyword recommendation page (400) is displayed. The search keyword recommendation page (400) is a website page and/or a page within a social network that contains various text and form fields. The text is meant to be read by followers of the social network newsfeed of a business, and the form fields are meant to be filled out (i.e. completed) by those followers (i.e. users), in the effort to help the business generate or modify a website to include more effective search keywords than the previous version. The search keyword recommendation page (400) contains various elements, including an introductory text that describes the goal of the search keyword recommendation page (400) to a user and provides information about the search keyword recommendation page (400); a number of search keyword fields, such as Search Keyword 1 field, Search Keyword 2 field, Search Keyword 3 field, Search Keyword 4 field, Search Keyword 5 field, Search Keyword 6 field, Search Keyword 7 field, Search Keyword 8 field, Search Keyword 9 field, and Search Keyword 10 field; and a submit button (402). Each Search Keyword field may be filled out (i.e. completed) with a search keyword term or phrase by a user. It should be noted that in other embodiments, more or less Search Keyword Fields may be included on the search keyword recommendation page (400).

The introductory text (e.g. at the top of search keyword recommendation page (400)) may contain any message that instructs a user to provide information in the rest of the search keyword recommendation page (400), such as "Jeremy, you can really help Mr. Smith out. By completing the following form, you'll give Mr. Smith valuable search keyword ideas for his website. You can be proud of the fact that you helped Mr. Smith to receive more visitors to his website! Complete the following search keyword fields, and Mr. Smith will be sent your search keyword recommendations!" The introductory text may address a user by his first, last or full name, and may act as an introduction to the rest of the search keyword recommendation page (400).

After the introductory text, but before the Search Keyword Fields, may be text describing the desired input from the user. For example, as shown in FIG. 4, the text may read, "Please provide 10 search keywords you would use when searching for Mr. Smith's business website. Please type in these search keywords in the order from most likely to use to less likely to use (i.e. search keyword 1 would be the most likely to use search keyword, and search keyword 10 would be the least likely to use search keyword of the set of 10 search keywords you have provided). Then, press 'submit'." A user may fill out the 10 Search Keyword Fields with 10 search keywords that the user would use when performing an internet search for Mr. Smith's business. After the user has filled-out the 10 Search Keyword Fields, the user may press or click-on the submit button (402) to submit the user's search keyword entries to the system. Those skilled in the art will appreciate that there may be various other functionalities associated with the search keyword recommendation page (400) than have been described.

Referring to FIG. 5, FIG. 5 shows a feedback page (500) in accordance with one or more embodiments of the invention. The feedback page (500) shown in FIG. 5 may be used, for instance, with the system (100), to perform the disclosed method. The elements shown in FIG. 5 may differ among embodiments of the invention, and one or more of the elements may be optional.

In FIG. 5, a feedback page (500) is displayed. The feedback page (500) is a website page and/or a page within a social network that contains various information relating to feedback to a business about recommended search keywords provided by users of a social network. For example, the feedback page (500) may contain a description, a listing of recommended search keywords, options of how to incorporate selected recommended search keyword into the website, and a submit button (502). The description contains text describing the remaining content of the feedback page (500), such as "Mr. Smith, you are well on your way to publishing your website with search keywords recommended by your friends, family, fans, and customers. Please select which search keywords from the search keyword listing below you would like included on your business website. (Please note that the search keywords below have been ranked from most popular search keyword to least popular search keyword of the top 10 recommended search keywords, with search keyword 1 being the most popular and search keyword 10 being the least popular.)" When a business owner wishes to have any of the listed search keywords incorporated into his website, he only needs to check the box next to each search keyword that he would like to have incorporated.

The options of how to incorporate selected recommended search keyword into the website are listed below the listing of recommended search keywords. There may be text above the options describing the options to the business owner, such as "Please indicate if you would like your selected search keywords to be included in the visible content of your website and/or the HTML metadata of your website." The business owner only needs to check the box next to the option(s) that he desires. After the business owner has made his search keyword selections and selected the incorporation option(s), the business owner may press or click-on the submit button (502) to submit the business owner's selections to the system. Those skilled in the art will appreciate that there may be various components of the feedback page (500). It should be noted that in other embodiments, there may be more or less recommended search keywords listed on the feedback page (500) than 10 as is shown in this figure. In addition, in some embodiments, there may be more or less options, for incorporating the selected search keywords into the website, listed on the feedback page (500) than two (2) as is shown in this figure.

Referring to FIG. 6, FIG. 6 shows the feedback page (500) of FIG. 5 completed by an exemplary business owner, Mr. Smith. In this figure, it is shown that Mr. Smith has selected search keywords "Design", "Affordable", "High End", "Modern", "Interior Design", "Mid Century", and "Furniture" to be incorporated into his business website. In addition, this figure shows that Mr. Smith has selected the options of his selected search keywords to be incorporated into this website by including them in the visual content of the website and by including them in the website's HTML metadata.

Figure 7:
FIG. 7 is a diagram of an exemplary business website that may be employed by the disclosed system and method according to one embodiment for a social engine optimizer (SEO) enhancer.

Referring to FIG. 7, FIG. 7 shows an example website in accordance with one or more embodiments of the invention. The example website shown in FIG. 7 may be, for instance, published and/or updated by the system (100). The elements shown in FIG. 7 may differ among embodiments of the invention, and one or more of the elements may be optional.

In FIG. 7, Mr. Smith's business website (700) is shown. Specifically, Mr. Smith's business website is shown to include the search keywords that Mr. Smith selected via the feedback page (500) in FIG. 6. In particular, at the bottom of the home page of Mr. Smith's business website, the selected search keywords "Design", "Affordable", "High End", "Modern", "Interior Design", "Mid Century", and "Furniture" (710) are listed across the page and are visible to visitors of the website. When a user performs an internet search with an internet search engine using any of these selected search keywords, the internet search results should now be more likely to locate Mr. Smith's business website.

Figure 8:
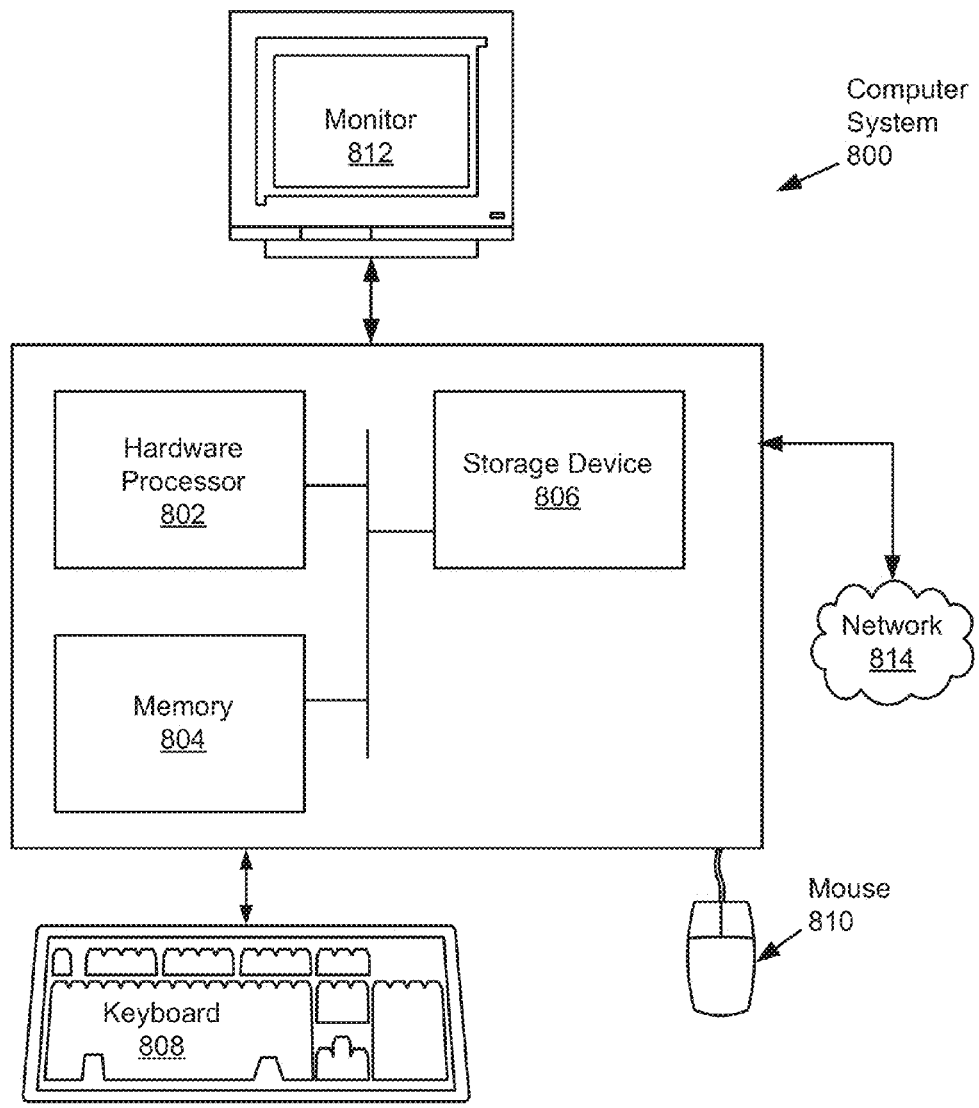
FIG. 8 is a diagram of components of a computing apparatus or system in which various embodiments may be implemented or that may be utilized to execute embodiments.

Embodiments of the invention may be implemented on virtually any type of computer regardless of the platform being used. For example, as shown in FIG. 8, a computer system (800) includes one or more processor(s) (802), an associated memory (804) (e.g. random access memory (RAM), cache memory, flash memory, etc.), a storage device (806) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g. a liquid crystal display (LCD), a plasma display, or cathode ray tube (CRT) monitor). The computer system (800) may be connected to a network (814) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g. request engine, post generation engine, newsfeed engine, recommendation page engine, presentation engine, selection engine, voting engine, ordering engine, keywords engine, industry engine, previous recommendations engine, and website publishing engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for identifying search keywords for searching for an online information resource, the method comprising:
   receiving, by a social website publishing application, from a business, a request for the search keywords relating to content of the online information resource of the business;
   generating, in response to receiving the request, a post comprising information about the business, a request to a plurality of users in a social network to provide the search keywords relating to the content of the online information resource of the business, and a link to a search keyword recommendation page;
   publishing, using a social network application, the post to a newsfeed in the social network, wherein the plurality of users in the social network subscribe to the newsfeed;
   receiving, in response to publishing the post and from the plurality of users, a plurality of search keywords relating to the content of the online information resource from the search keyword recommendation page;
   ranking, in response to receiving a plurality of search keywords, the search keywords in order from most popular to least popular;
   presenting, to the business, search keywords based at least in part upon the ranking;
   receiving, from the business, a selection of at least one search keyword from the search keywords that were presented to the business; and
   publishing the online information resource comprising the selected at least one search keyword.

2. The computer-implemented method of claim 1, wherein the post further comprises at least one of a name of the business, a name of an owner of the business, a location of the business, at least one product sold by the business, and an image of a home page of the online information resource of the business.

3. The computer-implemented method of claim 1, wherein the search keyword recommendation page comprises a request for a specified number of search keywords relating to the content of the online information resource of the business.

4. The computer-implemented method of claim 1, wherein a predetermined number of the highest ranked search keywords are presented to the business.

5. The computer-implemented method of claim 1, wherein the search keywords are presented to the business in an order from most popular to least popular.

6. The computer-implemented method of claim 1, wherein the method further comprises presenting, to the business, an option to publish the selected at least one search keyword on the online information resource by at least one of including the selected at least one search keyword as part of the content of the online information resource that can be viewed by visitors, and incorporating the selected at least one search keyword as part of HTML metadata of the online information resource.

7. The computer-implemented method of claim 6, wherein the method further comprises receiving, from the business, a selection of the option to publish the selected at least one search keyword on the online information resource.

8. The computer-implemented method of claim 7, wherein the selected at least one search keyword is published to the online information resource according to the selection, by the business, of the option to publish the selected at least one search keyword.

9. The computer-implemented method of claim 1, wherein the online information resource is a website.

10. A system for identifying search keywords for searching for an online information resource, the system comprising:
    a processor; and
    a social online information resource publishing application executable by the processor and configured to: receive, from a business, a request for the search keywords relating to content of the online information resource of the business; generate, in response to receiving the request, a post comprising information about the business, a request to a plurality of users in a social network to provide the search keywords relating to the content of the online information resource of the business, and a link to a search keyword recommendation page; publish, using a social network application, the post to a newsfeed in the social network, wherein the plurality of users in the social network subscribe to the newsfeed; receive, in response to publishing the post and from the plurality of users, a plurality of search keywords relating to the content of the online information resource from the search keyword recommendation page; rank, in response to receiving a plurality of search keywords, the search keywords in order from most popular to least popular; present, to the business, search keywords based at least in part upon the ranking; receive, from the business, a selection of at least one search keyword from the search keywords that were presented to the business; and publish the online information resource comprising the selected at least one search keyword.

11. The system of claim 10, wherein the post further comprises at least one of a name of the business, a name of an owner of the business, a location of the business, at least one product sold by the business, and an image of a home page of the online information resource of the business.

12. The system of claim 10, wherein the search keyword recommendation page comprises a request for a specified number of search keywords relating to the content of the online information resource of the business.

13. The system of claim 10, wherein the most search keywords are presented to the business in an order from most popular to least popular.

14. The system of claim 10, wherein a predetermined number of the highest ranked search keywords are presented to the business.

15. The system of claim 10, wherein the social online information resource publishing application is further configured to present, to the business, an option to publish the selected at least one search keyword on the online information resource by at least one of including the selected at least one search keyword as part of the content of the online information resource that can be viewed by visitors, and incorporating the selected at least one search keyword as part of HTML metadata of the online information resource.

16. The system of claim 15, wherein the social online information resource publishing application is further configured to receive, from the business, a selection of the option to publish the selected at least one search keyword on the online information resource.

17. The system of claim 16, wherein the selected at least one search keyword is published to the online information resource according to the selection, by the business, of the option to publish the selected at least one search keyword.

18. The system of claim 10, wherein the online information resource is a website.

19. A non-transitory computer readable storage medium storing instructions for identifying search keywords for searching for an online information resource, the instructions executable by a processor and comprising functionality for: receiving, from a business, a request for the search keywords relating to content of the online information resource of the business; generating, in response to receiving the request, a post comprising information about the business, a request to a plurality of users in a social network to provide the search keywords relating to the content of the online information resource of the business, and a link to a search keyword recommendation page; publishing, using a social network application, the post to a newsfeed in the social network, wherein the plurality of users in the social network subscribe to the newsfeed; receiving, in response to publishing the post and from the plurality of users, a plurality of search keywords relating to the content of the online information resource from the search keyword recommendation page; ranking, in response to receiving a plurality of search keywords, the search keywords in order from most popular to least popular; presenting, to the business, search keywords based at least in part upon the ranking; receiving, from the business, a selection of at least one search keyword from the search keywords that were presented to the business; and publishing the online information resource comprising the selected at least one search keyword.

20. The non-transitory computer readable storage of claim 19, wherein the post further comprises at least one of a name of the business, a name of an owner of the business, a location of the business, at least one product sold by the business, and an image of a home page of the online information resource of the business.

21. The non-transitory computer readable storage of claim 19, wherein the search keyword recommendation page comprises a request for a specified number of search keywords relating to the content of the online information resource of the business.

22. The non-transitory computer readable storage of claim 19, wherein the search keywords are presented to the business in an order from most popular to least popular.

23. The non-transitory computer readable storage of claim 19, wherein a predetermined number of the highest ranked search keywords are presented to the business.

24. The non-transitory computer readable storage of claim 19, wherein the instructions further comprise functionality for presenting, to the business, an option to publish the selected at least one search keyword on the online information resource by at least one of including the selected at least one search keyword as part of the content of the online information resource that can be viewed by visitors, and incorporating the selected at least one search keyword as part of HTML metadata of the online information resource.

25. The non-transitory computer readable storage of claim 24, wherein the instructions further comprise functionality for receiving, from the business, a selection of the option to publish the selected at least one search keyword on the online information resource.

26. The non-transitory computer readable storage of claim 25, wherein the selected at least one search keyword is published to the online information resource according to the selection, by the business, of the option to publish the selected at least one search keyword.

27. The non-transitory computer readable storage of claim 19, wherein the online information resource is a website.

\* \* \* \* \*